No. 625,739. Patented May 30, 1899.
C. BUERK.
NOODLE MACHINE.
(Application filed Mar. 13, 1899.)
(No Model.) 2 Sheets—Sheet 1.
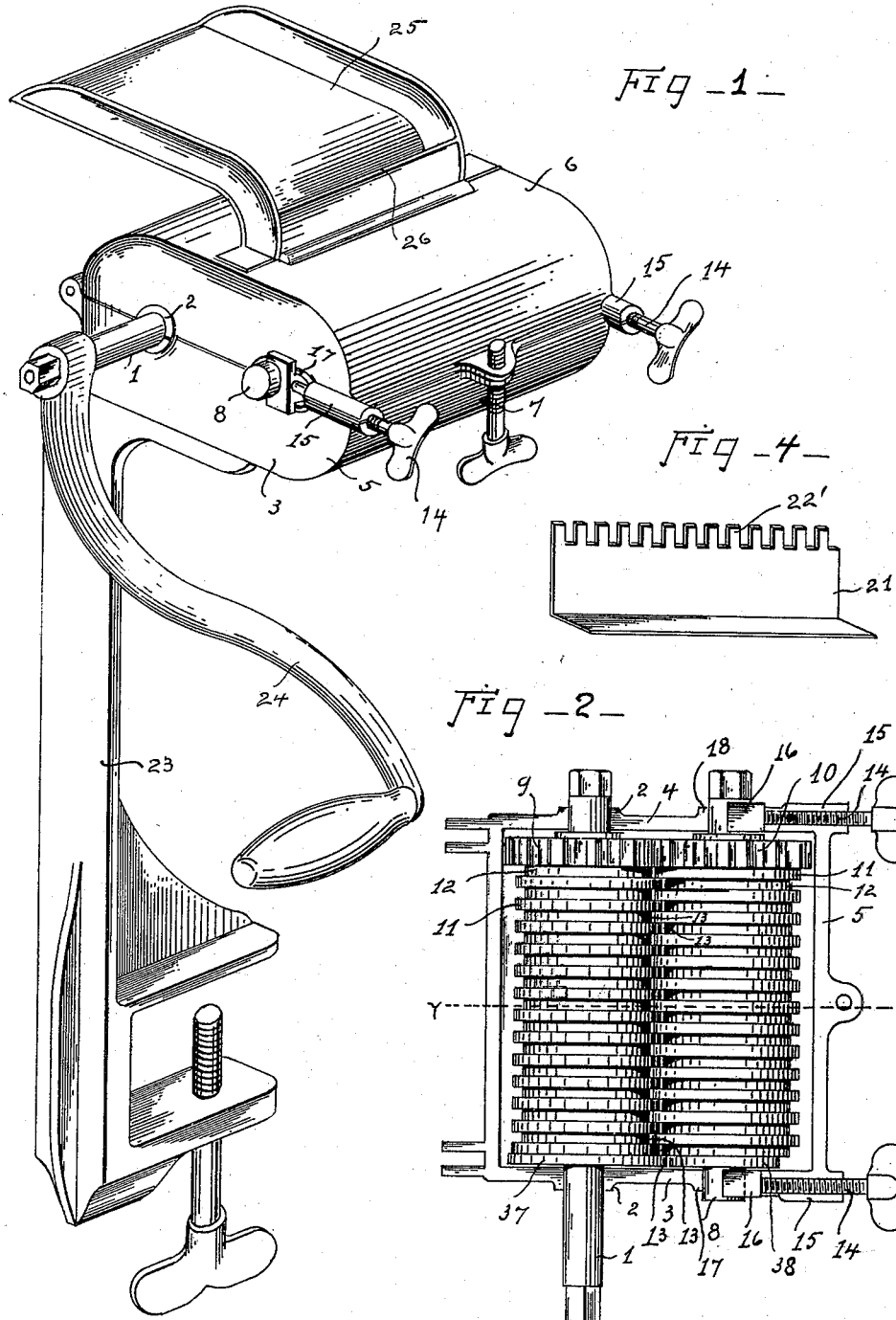

No. 625,739. Patented May 30, 1899.
C. BUERK.
NOODLE MACHINE.
(Application filed Mar. 13, 1899.)
(No Model.) 2 Sheets—Sheet 2.
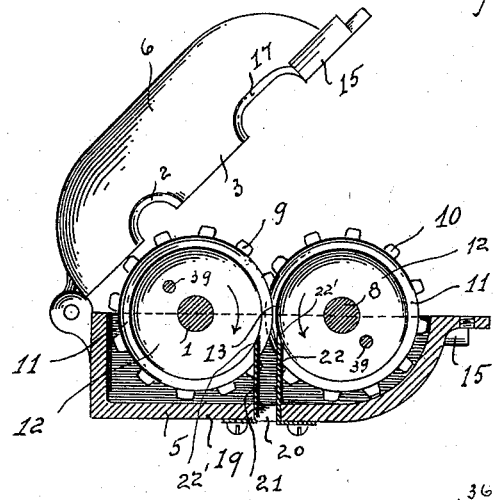
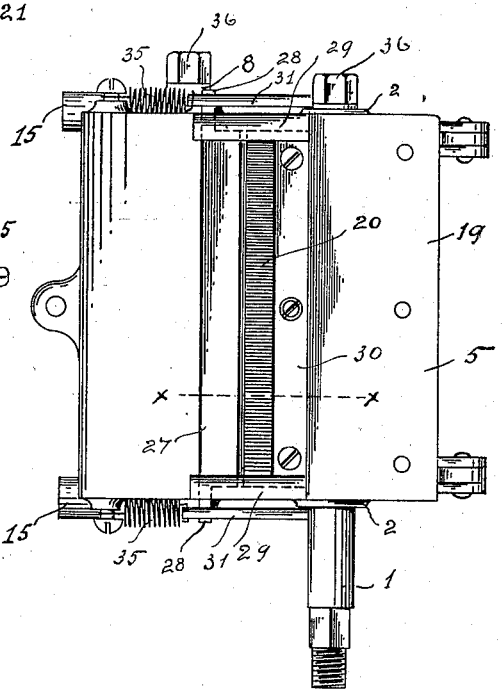
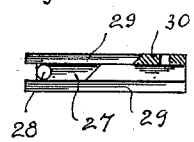
Witnesses
Herman H. Martin
Herman Busdieker
Inventor
Christ Buerk
By Robt B Wilson
his attorney

UNITED STATES PATENT OFFICE.

CHRIST BUERK, OF TOLEDO, OHIO.

NOODLE-MACHINE.

SPECIFICATION forming part of Letters Patent No. 625,739, dated May 30, 1899.

Application filed March 13, 1899. Serial No. 708,830. (No model.)

*To all whom it may concern:*

Be it known that I, CHRIST BUERK, a citizen of the United States, residing at Toledo, in the county of Lucas and State of Ohio, have invented a new and useful Improvement in Noodle-Machines, of which the following is a specification.

My invention relates to a noodle-machine, and has for its object to provide a mechanism of the above character adapted to readily reduce dough fed thereto into equal strips for noodles of any desired thickness and length.

A further object is to provide a portable mechanism for the above purpose adapted to be removably mounted upon a shelf or table-ledge and having a capacity of production to meet the demand of the ordinary culinary department and be of such a simplicity of construction as to attain the highest efficiency.

A further object is to obviate the necessity of rolling out the dough, as is generally required, by adapting the mechanism to be fed with dough taken directly from the mixing-receptacle for the constituent ingredients, and thereby save time and hard manual labor that would be required to roll the tenacious dough into thin sheets suitable for cutting into noodles.

A further object is to provide detachable means to the mechanism adapted to automatically and intermittently sever the continuous expressed equal strips of dough into predetermined lengths for noodles.

In the drawings, Figure 1 is an isometric view of a mechanism constructed in accordance with my invention. Fig. 2 is a plan view with the top housing removed. Fig. 3 is a cross-section on the line Y Y, Fig. 2. Fig. 4 is an isometric view of a stripper. Fig. 5 is a side elevation showing an actuating mechanism for intermittently reciprocating a shearing-blade. Fig. 6 is a plan view of the detachable cutting mechanism; and Fig. 7 is a section on the line X X, Fig. 6.

The object of the invention is accomplished by mounting a driving-arbor 1 within segmental journals 2, formed in bosses projecting outward from diametrically opposite walls 3 and 4 of a housing comprising a bottom section 5 and a top section 6, which latter is preferably pivotally secured to the rear of the bottom section, both being detachably clamped together forward by a thumb-screw 7 or any other suitable means, whereby the housing may be readily opened for the purpose of removal of the rollers for cleaning after use. 8 designates a driven arbor similarly and adjustably journaled in the walls 3 and 4 and is rotated by means of intermeshing gears 9 and 10, secured to the arbors 1 and 8, respectively. Upon each of the arbors there are secured a plurality of disks 11 of a diameter to rotate freely within the housing, and disks 11 are alternately spaced by disks 12 of a lesser diameter. The relative coactive positions of the disks are clearly shown in Figs. 2 and 3. Both figures disclose one of the larger disks 11 opposite one of the smaller disks 12 and alternating in spacing throughout the length of the arbors, forming thereby grooved rollers, the ridges of which overlap each other by entering the coincident opposite grooves and leave adjustable passages 13 for the expressing of the dough in rolled and cut strips suitable for noodles. The width of the passage is adjusted by means of thumb-screws 14, run in the internally-screw-threaded sectional bosses 15, which project from the walls 3 and 4 of the sectional housing. The thumb-screws are adapted to adjust the travel of the segmental pillow-blocks 16, which are located in the horizontally-elongated journal-openings 17 and 18 formed in the walls 3 and 4.

In the bottom 19 of the receptacle there is formed an aperture 20 for the discharge of the expressed strips of dough, which latter are removed from the grooves of the rollers by means of stripper-plates 21 and 22, having coincident serrated edges 22' to enter the grooves of each roller. The housing for the rollers is mounted upon a bracket 23, which is adapted to be secured to a shelf or table-ledge and is of a height to allow a receptacle to be set under the housing to receive the noodles.

The mechanism is operated by means of a crank 24, detachably secured to the driving-arbor 1, and the unrolled dough is fed to the rollers over a platen 25, terminating into a funnel 26, which delivers the dough between the rollers, where it is rolled out and discharged in continuous strips of equal dimensions.

For the purpose of intermittently severing the strips into a length suitable for noodles I have provided an attachable mechanism comprising a reciprocating shearing-blade 27, which has projecting pintles 28 formed thereon upon opposite sides, and the blade is adapted to travel in ways 29 through the path of delivery of the continuous strips. The ways are secured to the bottom of the housing and are formed, preferably, integral with a stationary shearing-blade 30, located at the terminal of the stroke of the reciprocating blade.

An intermittent reciprocation of the movable blade is transmitted from the rollers by means of levers 31, pivotally secured to the top section of the housing and having projecting therefrom shoulders 32, which are located in the path of rotating cams 33, having one or more shoulders adapted to oscillate the levers during the revolution of the rollers by engaging the shoulders formed upon the levers, and thereby reciprocate the movable blade in the path of delivery by the engagement of its projecting pintles within slots 34, formed in the lower terminal of the levers. The movable blade is quickly withdrawn after severing the strips of dough by means of springs 35, which are secured to the housing and the levers.

As a preferred form of construction the disks are secured upon the arbors 1 and 8 by means of screw-caps 36, adapted to compress the disks between the gears and shoulders 37 and 38, formed integral with the arbors, and as a further precaution against slipping or independent movement of the disks I have provided rods 39, adapted to be inserted through suitable orifices provided therefor in the roller elements, and thereby rigidly connecting all disks to the shoulders.

By enlarging the mechanism and providing a suitable base the manufacture of noodles in large quantities is readily accomplished, and by substituting disks of varying width and profile any desired form of noodles can be produced.

What I claim is—

1. In a noodle-machine, a sectional housing, mounted upon a bracket, arbors journaled in diametric opposite walls of the housing, and having mounted thereon a plurality of disks of different diameter, whereby there are formed grooved rollers, the ridges of one roller overlapping the ridges of the opposite roller by entering the alternate opposite grooves, means for adjusting the distance between the rollers, a stripper-plate in contact with each roller, means for transmitting motion from the driving to the driven arbor, and openings in the housing for the feeding of dough and exit of continuous expressed strips, and a feed-platen detachably secured to the feed-opening.

2. In a noodle-machine, a sectional housing, mounted upon a bracket, arbors journaled in diametric opposite walls of the housing, and having mounted thereon a plurality of disks of different diameter, whereby there are formed grooved rollers, the ridges of one roller overlapping the ridges of the opposite roller by entering the alternate opposite grooves, means for adjusting the distance between the rollers, a stripper-plate in contact with each roller, means for transmitting motion from the driving to the driven arbor, and openings in the housing for the feeding of dough and exit of continuous expressed strips, and a feed-platen detachably secured to the feed-opening, and means for automatically and intermittently severing the continuous expressed strips of the dough into desired lengths.

3. In a noodle-machine, a housing comprising a bottom section, and a top section adapted to be detachably secured to the bottom section, a bracket secured thereto adapted to support the housing, rollers mounted within journals formed in opposite walls of the housing having parallel grooves formed upon their length, means for driving one roller and transmitting motion to the driven roller, a stripper-blade in contact with each roller and forming a path of exit for the expressed strips of dough, a feed-platen secured to the top section of the housing terminating in a funnel, adapted to deliver unrolled dough between the rollers through an aperture formed in the top section, means for adjusting the distance between the rollers, means for automatically and intermittently severing continuous expressed strips of dough to a desired length, comprising a stationary blade adjacent to the path of delivery, and a movable blade adapted to reciprocate in guides through the path of delivery, means for actuating the blade from one of the rollers in the direction of shearing the expressed strips, and means for withdrawing the movable blade to its original position.

In witness whereof I have hereunto set my hand this 8th day of March, 1899.

CHRIST BUERK.

Witnesses:
HERMAN H. MARTIN,
HERMAN BUSDIEKER.